(12) United States Patent
Rahman et al.

(10) Patent No.: US 11,385,357 B2
(45) Date of Patent: Jul. 12, 2022

(54) STORING AND PROVIDING RAW SATELLITE DATA

(71) Applicant: Verizon Patent and Licensing Inc., Arlington, VA (US)

(72) Inventors: Mohammed M. Rahman, Allen, TX (US); Christopher N. Delregno, Rowlett, TX (US); William F. Copeland, Garland, TX (US); Gina L. Otts, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 734 days.

(21) Appl. No.: 16/389,377

(22) Filed: Apr. 19, 2019

(65) Prior Publication Data

US 2020/0333469 A1    Oct. 22, 2020

(51) Int. Cl.
| | | |
|---|---|---|
| *G06F 9/54* | (2006.01) | |
| *G01S 19/25* | (2010.01) | |
| *G06F 16/17* | (2019.01) | |
| *G01S 19/43* | (2010.01) | |
| *G01S 19/04* | (2010.01) | |

(52) U.S. Cl.
CPC ............ *G01S 19/258* (2013.01); *G06F 9/547* (2013.01); *G06F 16/1727* (2019.01); *G01S 19/04* (2013.01); *G01S 19/43* (2013.01)

(58) Field of Classification Search
None
See application file for complete search history.

(56) References Cited

U.S. PATENT DOCUMENTS

| | | | | |
|---|---|---|---|---|
| 2005/0130590 A1* | 6/2005 | Pande | ...................... | G01S 19/37 342/357.41 |
| 2005/0162312 A1* | 7/2005 | Riday | .................. | G01S 19/258 342/357.34 |

\* cited by examiner

*Primary Examiner* — Craig C Dorais

(57) ABSTRACT

A microservice node can store first raw satellite data, associated with a first satellite constellation, in a first electronic file in a first data store, can combine the first electronic file and one or more second electronic files, associated with the first satellite constellation, into a first compressed electronic file, and can store the first compressed electronic file in a second data store. The first raw satellite data and second raw satellite data can be received during a particular time period. The second data store can include a second compressed electronic file that includes third raw satellite data associated with a second satellite constellation. The microservice node can receive a request from a client device, can combine the first compressed electronic file and the second compressed electronic file into a third compressed electronic file based on the request, and can transmit the third compressed electronic file to the client device.

20 Claims, 12 Drawing Sheets

STORING AND PROVIDING RAW SATELLITE DATA

BACKGROUND

Global Navigation Satellite System (GNSS) is a generic term for a satellite navigation system that provides autonomous geo-spatial positioning with global coverage. The most ubiquitous of these technologies is the Global Positioning System (GPS).

DETAILED DESCRIPTION OF PREFERRED EMBODIMENTS

Figure 1A:
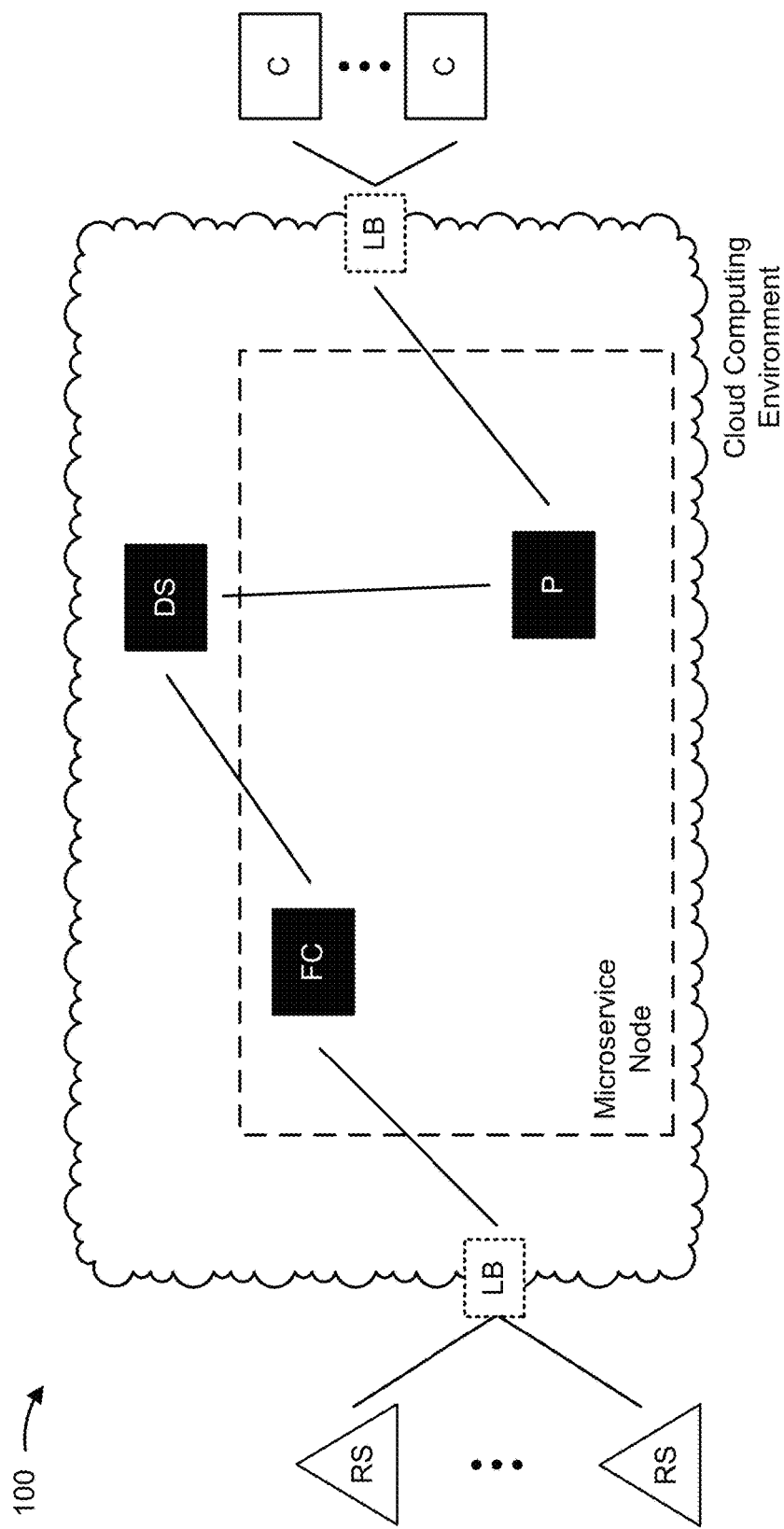
FIGS. 1A-1H are diagrams of one or more example implementations described herein.

The following detailed description of example implementations refers to the accompanying drawings. The same reference numbers in different drawings can identify the same or similar elements.

A global navigation satellite system (GNSS) signal in space provides a worst-case pseudo-range accuracy of 7.8 meters at a 95% confidence level, before any terrestrial biases or errors are introduced, such as ionospheric delay, tropospheric delay, receiver noise, receiver clock errors, signal multipath, and/or the like. These errors can introduce further inaccuracy and/or imprecision (e.g., by several meters).

This level of inaccuracy and imprecision can be tolerated in some applications. For example, a driver of a vehicle can be directed to a wrong side of a building, a block away from a target location, and/or the like, but such inaccuracy and imprecision can be overcome in practice (e.g., when the driver can circle the building, when the driver can see the target location despite being inaccurately directed, and/or the like). However, in many other applications, these limitations could lead to catastrophic results. For example, in an autonomous vehicle application these limitations can result in an autonomous vehicle not being in a right lane to make a turn or pick up a passenger, the autonomous vehicle identifying a curb as a street, the autonomous vehicle drifting into oncoming traffic, and/or the like. Other examples of applications in which such inaccuracy or imprecision cannot be tolerated include autonomous drones, mobile robotics, precision advertising, and many others.

Real-Time Kinematics (RTK) is one solution that allows for GNSS corrections to vastly improve location positioning in order to provide a hyper-accurate location service. RTK leverages a phase of a carrier, without regard to information modulated on the carrier and, as such, can provide greater accuracy, approaching millimeter precision. RTK relies on fixed and well-surveyed reference stations to transmit corrections data to in-range client devices. Because a given physical station is well-surveyed, an actual position of the reference station is known. Here, the physical reference station receives raw satellite data from a group of (e.g., five or more) GNSS satellites (referred to as a satellite constellation), and then generates corrections data needed to adjust a given satellite's estimated signal location in order to provide a more accurate physical location. These corrections against the physical reference station are used by the client devices to make similar adjustments.

In some cases, a client device can be equipped with RTK capabilities and can generate corrections data needed to adjust a given satellite's estimated signal location instead of (or in addition to) having a reference station generate the corrections data. In this case, the client device can request raw satellite data from a nearby reference station, can receive the raw satellite data from the reference station, and can generate the corrections data based on the raw satellite data.

In some cases, a typical reference station can accommodate only a few concurrent sessions on the reference station, which can result in a bottleneck if a large quantity of client devices attempts to concurrently access raw satellite data at a reference station. Moreover, client devices that are not in range of a reference station can be unable to receive raw satellite data stored at the reference station. Thus, no solution exists that provides capability for providing raw satellite data, from a reference station, to hundreds or thousands of concurrent client devices in a highly elastic, highly resilient cloud-scale environment.

Some implementations described herein provide a microservice node that is capable of storing and providing raw satellite data to a large scale of geographically distributed client devices, which can number in the millions or more. Reference stations can transmit raw satellite data to the microservice node so that the microservice node can store the raw satellite data and service client devices by transmitting the raw satellite data to the client devices in a way that easily scales as the quantity of client devices increases. This alleviates the bottlenecking issue at the reference stations and allows client devices that might not be in range of a reference station to receive raw satellite data.

FIGS. 1A-1H are diagrams of one or more example implementations 100 described herein. In some implementations, example implementation(s) 100 can illustrate an example of a microservice node storing and providing raw satellite data. The microservice node can be communicatively connected with one or more geographically spaced apart reference stations and one or more client devices.

A client device can include an RTK-enabled client device that is configured with an RTK engine, which can use raw satellite data to generate corrections data by adjusting a given satellite's estimated signal location based on a known location of a reference station. The RTK engine can use the corrections data to correct a GNSS satellite-estimated physical location of the client device in order to determine a hyper-accurate location of the client device. In this way, the client device can use the corrections data, along with other observables, to calculate a comparatively more accurate and/or precise physical location (e.g., as compared to using other GNSS methods), which can provide an accuracy of location to within centimeters (e.g., an accuracy that is not capable of being provided by GNSS systems). This can improve performance of the client device, an application associated with the client device (e.g., a ride share application, an application associated with autonomous operation, and/or the like), and/or a service provided to a user of the client device (e.g., a ride sharing service, an autonomous navigation service, and/or the like).

A reference station can include one or more devices that receive raw satellite data from one or more satellites, from one or more satellite constellations, and/or the like. The raw satellite data, associated with a particular satellite (or satellite constellation) can include, for example, a satellite identifier associated with the satellite (e.g., a pseudo-random noise sequence or Gold code that the satellite transmits to differentiate the satellite from other satellites in the satellite constellation), a constellation identifier associated with the satellite constellation, pseudo range observations associated with the satellite and/or each satellite included in the satellite constellation, phase range observations associated with the satellite and/or each satellite included in the satellite constellation (e.g., instantaneous carrier phase and cumulative quantity of complete phase cycles since a last loss of lock), delay observations associated with the satellite and/or each satellite included in the satellite constellation (e.g., delay of the pseudorandom code modulated on a given carrier), received signal strength for each carrier signal from the satellite and/or each satellite included in the satellite constellation, and/or the like. In some implementations, a reference station can transmit the raw satellite data to the microservice node, can use the raw satellite data to generate corrections data for one or more satellites, and/or the like.

The microservice node includes a system (e.g., one or more devices) capable of storing and providing raw satellite data to one or more client devices. In some implementations, the microservice node can be at least partially implemented in a cloud computing environment (e.g., as shown in FIGS. 1A-1H). As shown in FIG. 1A, the microservice node can include a format converter device, a post processor device, and/or the like. The microservice node can be arranged to communicate with the one or more reference stations, the one or more client devices, and a data store device included in the cloud computing environment. In some implementations, the data store device can include a cloud-based storage platform, can be included in the microservice node as a microservice, and/or the like. Load balancers can be appropriately arranged in order to balance traffic between the microservice node and another microservice node, between one or more devices included in the microservice node, between one or more devices included in the microservice node and one or more devices external to the microservice node (e.g., between a reference station and the format converter device, between a client device and the post processor device, and/or the like), and/or the like.

The format converter device includes one or more devices that are capable of storing raw data from the reference stations. For example, the device format converter can include a storage agent that pulls the streams from a message queue (e.g., a Kafka queue) and stores the streams in relevant files. In this case, the format converter device may convert the raw data from the reference station data format (e.g., RTCM and/or another format) to a receiver independent exchange format (RINEX) format.

In some implementations, the format converter device may be capable of providing a network RTK engine for the microservice node. The network RTK engine can be capable of receiving corrections data from a reference station, receiving raw satellite data from the reference station, capable of storing the corrections data and/or the raw satellite data in a local data store (or another data store associated with the network RTK engine), and/or the like. In some implementations, the network RTK engine can be a part of a corrections as a service (CaaS) microservice provided by the microservice node. In this case, the network RTK engine can receive virtual location data associated with a virtual reference station (VRS) and can modify the corrections data based on the virtual location data associated with the VRS in order to generate corrections data for the VRS.

A VRS can include a reference station that is virtualized (e.g., by a virtual machine and/or virtual container) that is assigned a virtual (or logical) location that corresponds to a physical location in a geographic area between reference stations (i.e., physical reference stations). The virtual location can be a static location (e.g., the VRS is a static VRS that is assigned a virtual location that does not change) or a dynamic location (e.g., the VRS is a dynamic VRS that is assigned a virtual location that can change). The network RTK engine can use an error model (e.g., a model of interpolated terrestrial biases and/or errors), associated with the geographic area, to modify the corrections data of the reference station in order to generate corrections data for the VRS. In this way, the use of VRS's, in conjunction with physical reference stations, permits the physical reference stations to be spaced further apart (e.g., 50-70 km as opposed to 10-20 km without the use of VRS's), which reduces the cost and complexity of deploying and/or maintaining a network of reference stations.

The data store device includes one or more devices capable of providing a data store for storing raw satellite data associated with one or more satellites, associated with one or more satellite constellations, and/or the like. In some implementations, the data store can include a memory device, a storage device, a cloud-based storage platform, a database, one or more electronic file systems, and/or the like. In some implementations, the format converter device can store raw satellite data associated, associated with a satellite constellation, in a compressed electronic file in the data store.

A compressed electronic file, that includes raw satellite data associated with a particular satellite constellation, can include raw satellite data from one or more reference stations. For example, a compressed electronic file, that includes raw satellite data associated with a particular satellite constellation, can include raw satellite data, received from the satellite constellation, at a first reference station, can include raw satellite data, received from the satellite constellation, at a second reference station, and so on. Moreover, a compressed electronic file, that includes raw satellite data associated with a particular satellite constellation, can include raw satellite data that was received at the one or more reference stations during a particular time period (e.g., a one-hour time period, a 30-minute time period, and/or the like). In this case, the data store device can store a plurality of compressed electronic files, for a particular satellite constellation, that cover a plurality of time periods.

The post processor device can include one or more devices capable of receiving, from client devices, requests for raw satellite data, capable of providing raw satellite data to the client devices, and/or the like. In some implementations, the post processor device can provide an application programming interface (API), such as a representational state transfer (REST) API via which client devices can transmit requests for raw satellite data to the post processor device (e.g., using a hypertext transfer protocol (HTTP) GET method) and which the post processor device can transmit the raw satellite data (e.g., using an HTTP POST method). In some implementations, the post processor device can provide a web portal via which client devices can transmit the requests for raw satellite data to the post processor device and which the post processor device can transmit the raw satellite data. In some implementations, the post processing device can use other techniques to transmit the raw satellite data to the client devices, such as using file transfer protocol (FTP) and/or the like.

Figure 1B:
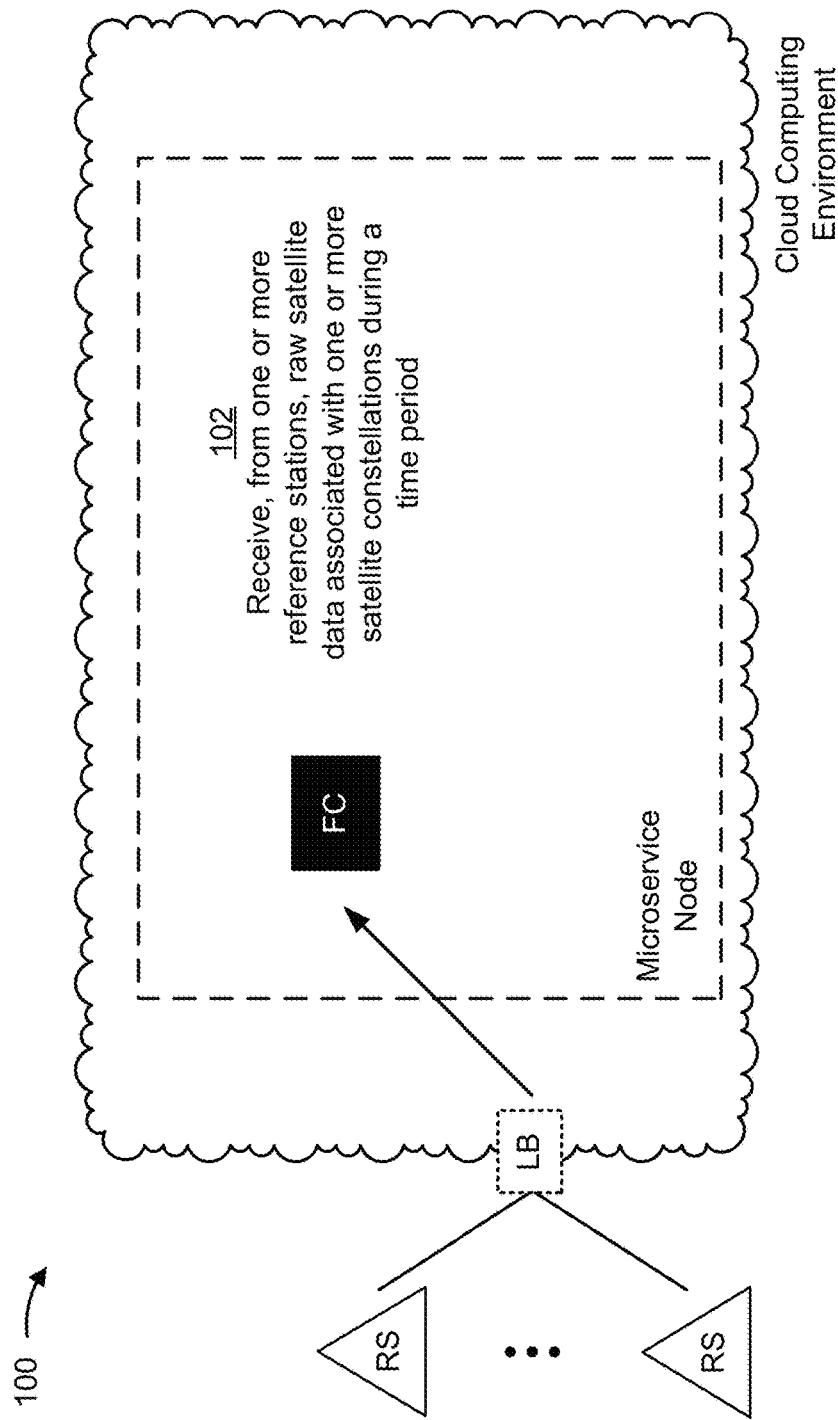

As shown in FIG. 1B, and by reference number 102, in order to store raw satellite data in the data store provided by the data store device, the format converter device can receive, from one or more reference stations, raw satellite data associated with one or more satellite constellations during a time period. In some implementations, the format converter device can receive the raw satellite data based on transmitting a request, to the one or more reference stations, for the raw satellite data. In some implementations, the format converter device can receive the raw satellite data based on the one or more reference stations receiving the raw satellite data from the satellites included in the one or more satellite constellations.

Figure 1C:
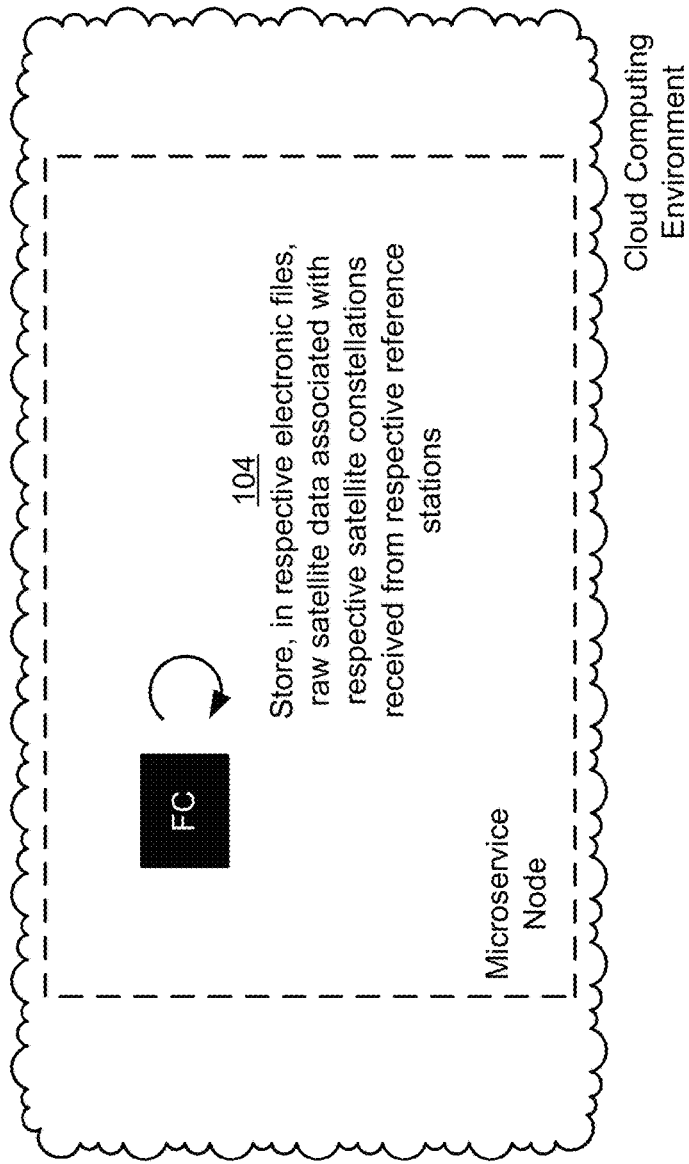

As shown in FIG. 1C, and by reference number 104, the format converter device can store, in respective electronic files, raw satellite data associated with respective satellite constellations that was received from respective reference stations. For example, the format converter device can store, in a first electronic file, raw satellite data associated with a first satellite constellation that was received at a first reference station, can store, in a second electronic file, raw satellite data associated with the first satellite constellation that was received at a second reference station, can store, in a third electronic file, raw satellite data associated with a second satellite constellation that was received at a third reference station (which can be the first reference station, the second reference station, or another reference station), can store, in a fourth electronic file, raw satellite data associated with the second satellite constellation that was received at a fourth reference station (which can be the first reference station, the second reference station, or another reference station), and so on.

In some implementations, the format converter device can store the electronic files in a local data store associated with the format converter device and/or provided by the format converter device. In some implementations, the format converter device can stream the raw satellite data, from the one or more reference stations, into the electronic files, stored in the local data store, during a time duration.

In some implementations, the format converter device may convert the raw satellite data, received from the one or more reference stations, from an RTCM format to one or more other formats. For example, format converter device may convert the raw satellite data from the RTCM format to an RINEX version 3.02 format, an RINEX standard 2.11 format, a BINEX, proprietary format, and/or other types of formats.

Figure 1D:
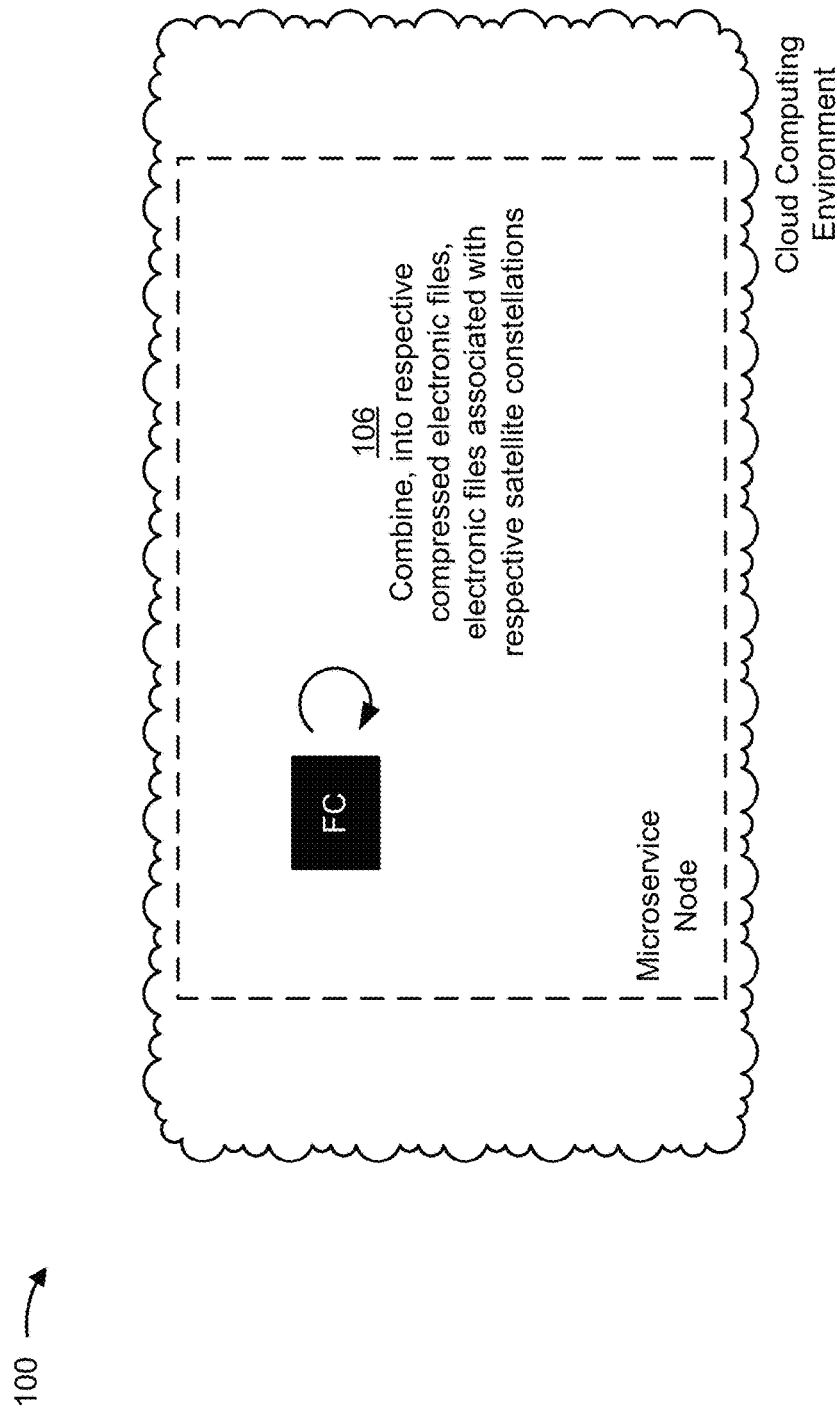

As shown in FIG. 1D, and by reference number 106, at or after the expiration of the time duration, the format converter device can combine the electronic files, described above in connection with reference number 104, into compressed electronic files associated with the respective satellite constellations. For example, the format converter device can combine the electronic files, associated with a first satellite constellation (e.g., that include raw satellite data that was received from the first satellite constellation during the time period) and received at respective reference stations, into a first compressed electronic file associated with the first satellite constellation, can combine the electronic files, associated with a second satellite constellation (e.g., that include raw satellite data that was received from the second satellite constellation during the time period) and received at respective reference stations, into a second compressed electronic file associated with the second satellite constellation, and/or the like.

Figure 1E:
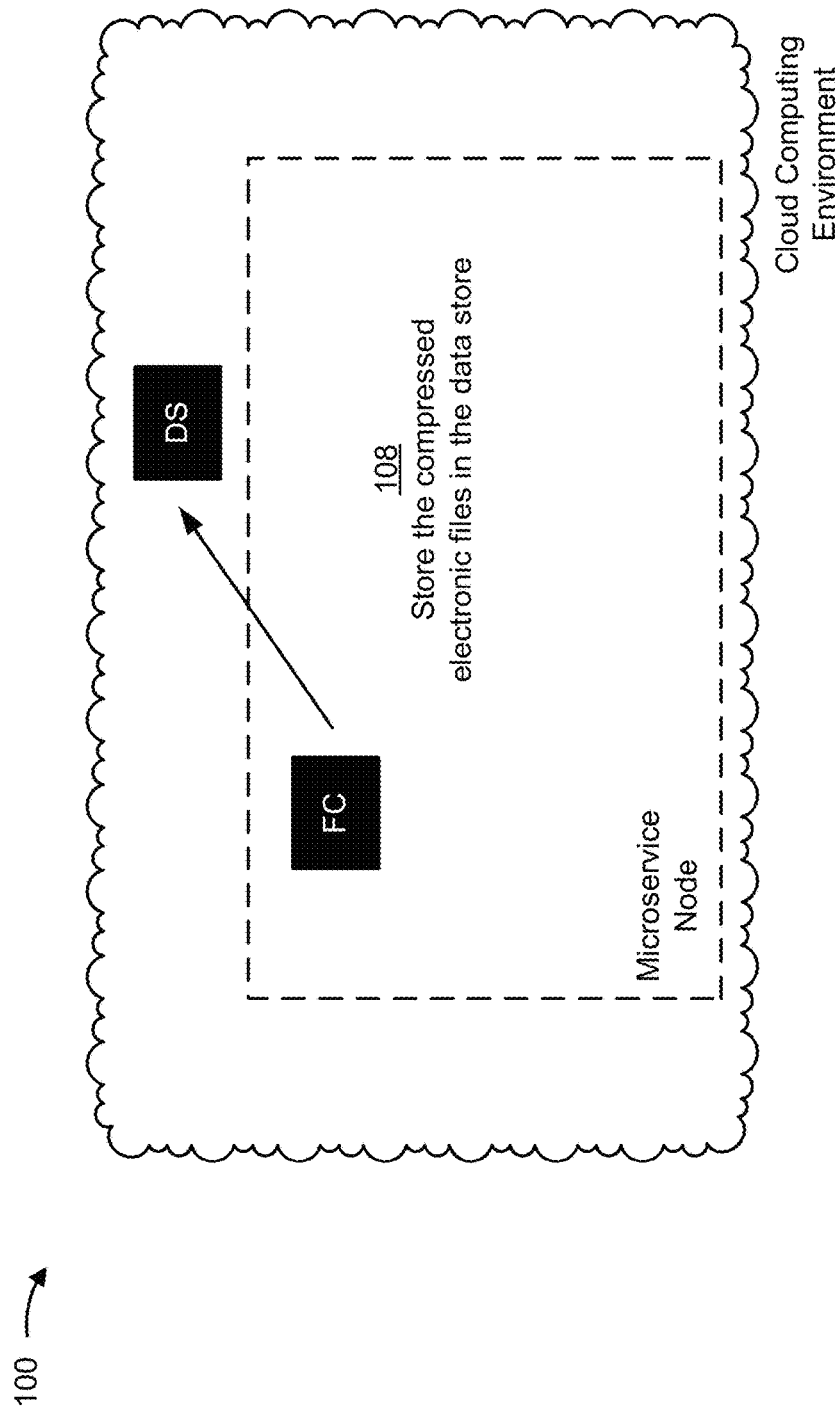

As shown in FIG. 1E, and by reference number 108, the format converter device can store the compressed electronic files in the data store provided by the data store device. The format converter device can associate information with each respective compressed electronic file (e.g., as metadata associated with each respective compressed electronic file, as database information associated with each respective compressed electronic file, and/or the like) and store the associated information in the data store. The information, associated with a respective compressed electronic file, can include information identifying a time period during which the raw satellite data included in the compressed electronic file was received (e.g., a date and time, a timestamp, and/or the like), can include information identifying the satellite constellation associated with the compressed electronic file (e.g., a satellite constellation name, a satellite constellation identifier, and/or the like), can include information identifying the reference stations that provided the raw satellite information included in the compressed electronic file (e.g., the receiver identifiers associated with the reference stations), and/or the like.

In some implementations, the format converter device can continue to perform the techniques and/or actions described above, in connection with reference numbers 102-108, to store raw satellite data that is received in subsequent time periods. Once compressed electronic files for a given time period are stored in the data store provided by the data store device, client devices can communicate with the post processor device (e.g., via the API and/or the web portal) to request and receive the compressed electronic files.

Figure 1F:
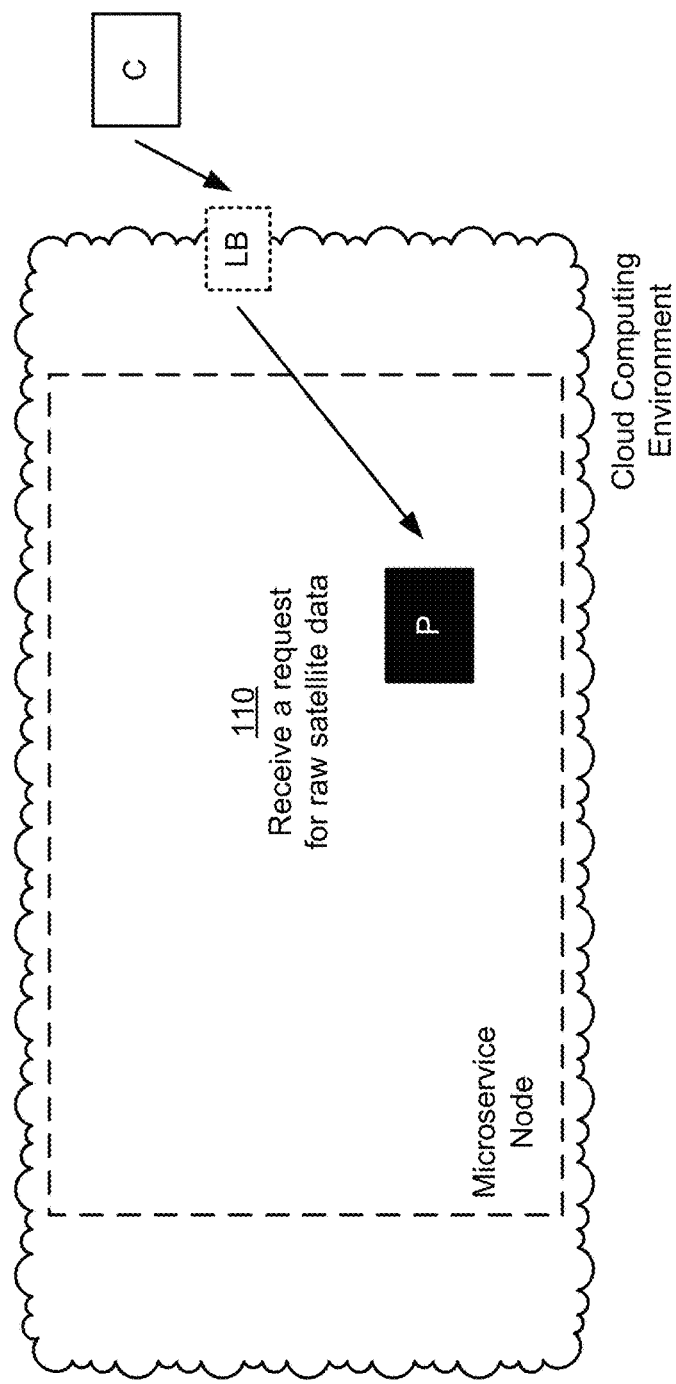

As shown in FIG. 1F, and by reference number 110, the post processor device can receive a request for raw satellite data. The request can be received via the API (e.g., REST API or another type of API) and/or the web portal provided by the post processor device. The request can specify one or more parameters, such as one or more satellite constellations, one or more reference stations, and/or one or more time periods for which raw satellite data is to be provided to the client device. In some implementations, when the client device provides the request via the API, the client device can specify the one or more satellite constellations, the one or more reference stations, and/or the one or more time periods as parameters in an API call (e.g., an HTTP GET method). In some implementations, when the client device provides the request via the web portal, a user can use the client device to complete and transmit a request form via the web portal. The request form can include fields in which the one or more satellite constellations, the one or more reference stations, and/or the one or more time periods can be specified.

Figure 1G:
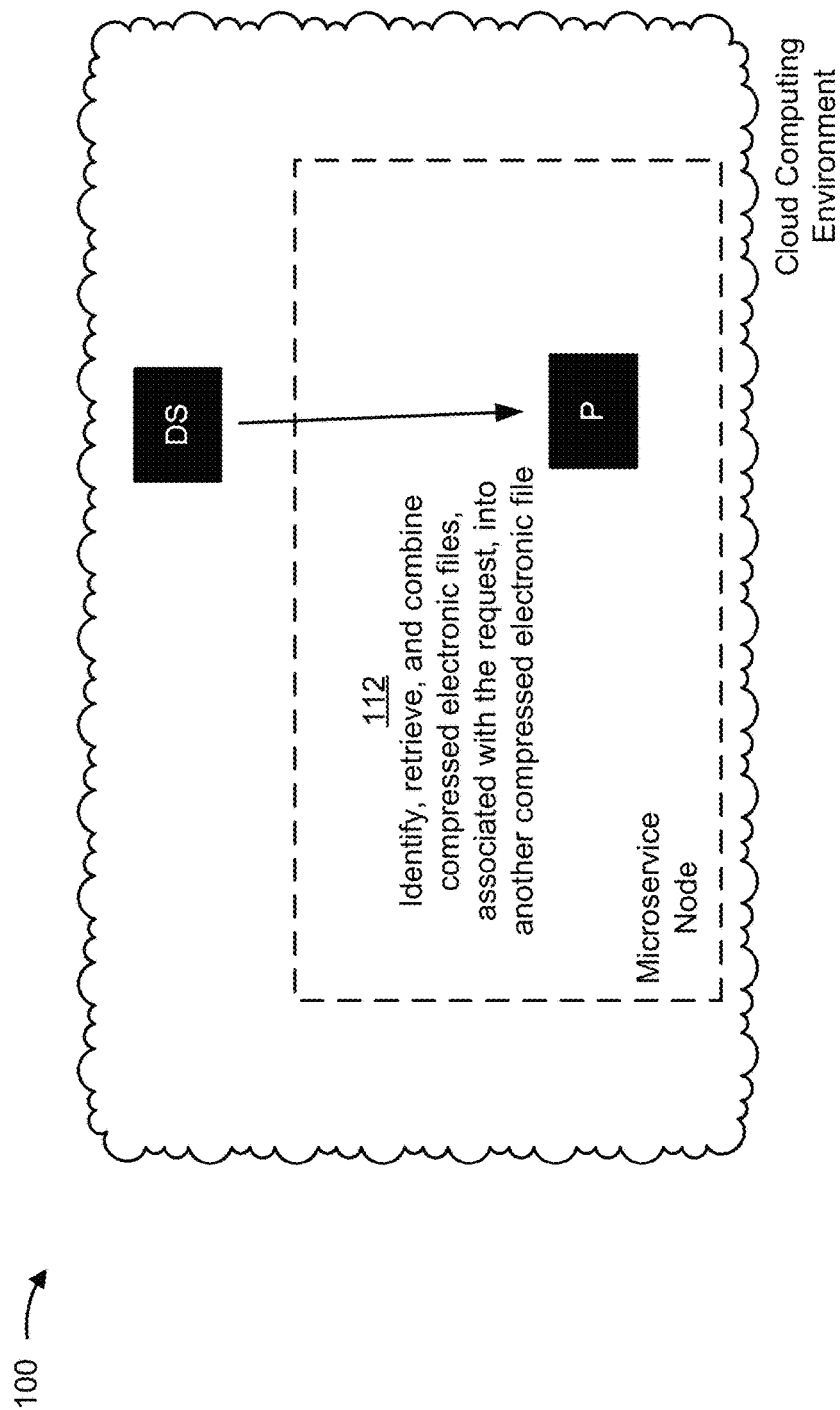

As shown in FIG. 1G, and by reference number 112, the post processor device can identify, retrieve, and combine the compressed electronic files, associated with the request, into another compressed electronic file. In some implementations, prior to identifying, retrieving, and combining the compressed electronic files, the post processor device can verify that the client device has permission to access the microservice node, the data store, and/or the raw satellite data stored in the data store. For example, the client device can transmit, to the post processor device, a username and password, a passcode, an authentication token, and/or another means of authentication, and the post processor device can verify the username and password, passcode, authentication token, and/or the like, with an authentication server. In some implementations, the authentication server can be included in the cloud computing environment and/or the microservice node. In some implementations, the authentication server can be external to the cloud computing environment and/or the microservice node.

In some implementations, the post processor device can identify the compressed electronic files, stored in the data store, based on the one or more parameters specified in the request. For example, the post processor device can identify the compressed electronic files that include raw satellite data associated with the one or more satellite constellations specified in the request, that was received by the one or more reference stations specified in the request, and/or that was received during the one or more time periods specified in the request. In some implementations, the post processor device can identify the compressed electronic files based on the information, associated with the compressed electronic files, stored in the data store.

The post processor device can retrieve the compressed electronic files by obtaining the electronic files from the data store, by transmitting a request, to the data store device, for the electronic files, by querying the data store for the electronic files, and/or the like. Once the post processor device has retrieved the compressed electronic files, the post processor device can combine the compressed electronic files into the other compressed electronic file so that only a single file is to be transmitted to the client device.

Figure 1H:
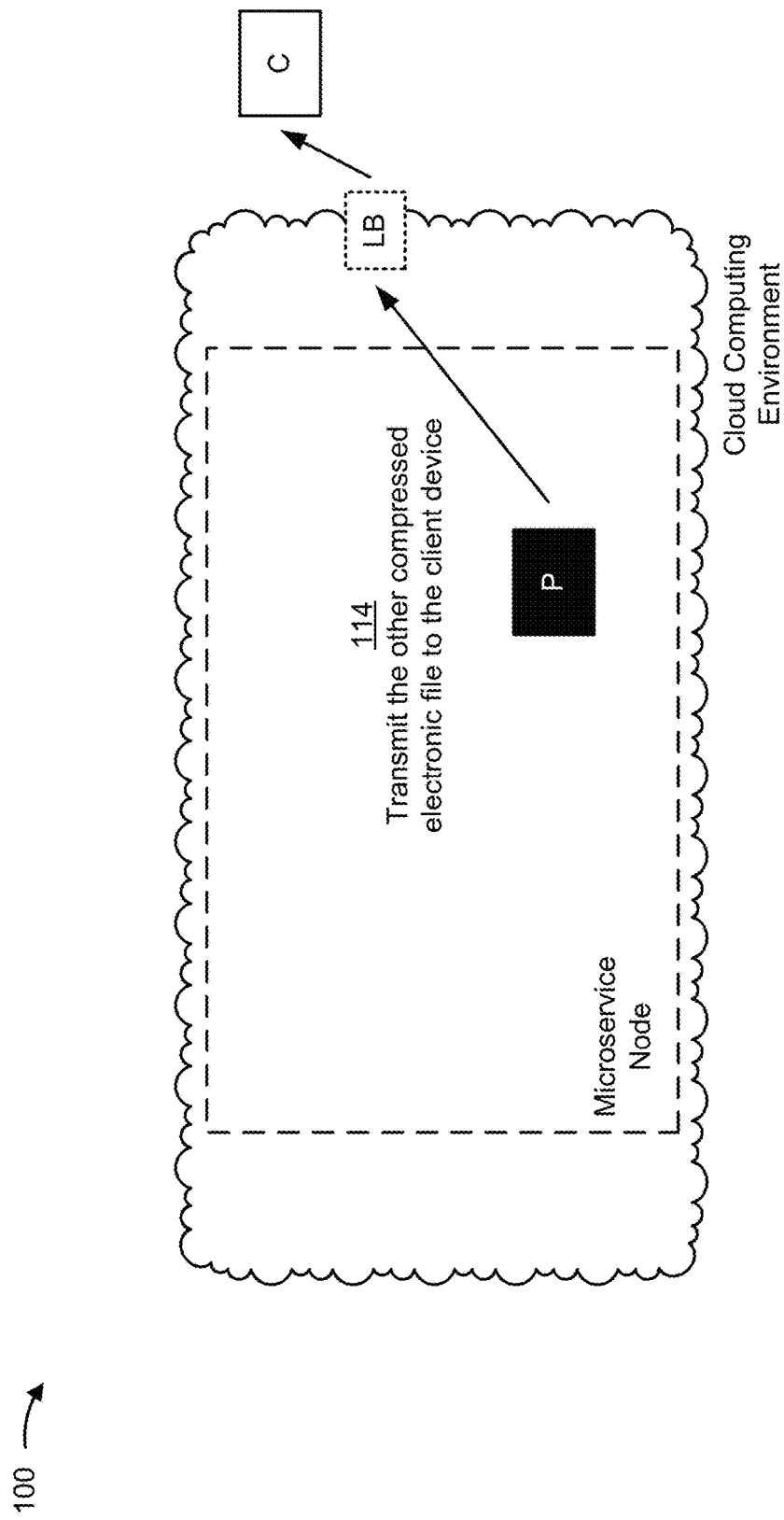

As shown in FIG. 1H, and by reference number 114, the post processor device can provide the other compressed electronic file to the client device to satisfy the request for the raw satellite data. In some implementations, the post processor device can provide the other compressed electronic file via the API (e.g., using an HTTP POST method and/or another method). In some implementations, the post processor device can provide the other compressed electronic file via the web portal.

The client device can use raw satellite data in an RTK engine to generate corrections data by adjusting estimated signal locations, associated with one or more satellites included in the one or more satellite constellations, based on the known location of the one or more reference stations. The client device can use the corrections data to correct a GNSS satellite-estimated physical location of the client device (and/or other client devices) in order to determine a hyper-accurate location of the client device (and/or other client devices). In this way, the client device can use the corrections data, along with other observables, to calculate a comparatively more accurate and/or precise physical location (e.g., as compared to using other GNSS methods), which can provide an accuracy of location to within centimeters (e.g., an accuracy that is not capable of being provided by GNSS systems). This can improve performance of the client device (and/or other client devices), an application associated with the client device (and/or other client devices), such as high-definition maps creation, device tracking (e.g. track & trace, ankle monitors, and/or the like), environmental/weather analysis, and/or the like.

In this way, the microservice node is capable of storing and providing raw satellite data to a large scale of geographically distributed client devices, which can number in the millions or more. The reference stations can transmit raw satellite data to the microservice node so that the microservice node can store the raw satellite data and service client devices by transmitting the raw satellite data to the client devices in a way that easily scales as the quantity of client devices increases. This alleviates bottlenecking issues at the reference stations (e.g., associated with limitations on the quantity of concurrent sessions permitted at the reference stations) and allows client devices that might not be in range of a reference station to receive raw satellite data.

As indicated above, FIGS. 1A-1H are provided merely as one or more examples. Other examples can differ from what is described with regard to FIGS. 1A-1H. For example, while a single microservice node is shown in FIGS. 1A-1H, multiple microservice nodes can be configured (e.g., multiple microservice nodes can be configured on computing resources of the cloud computing environment or another cloud computing environment). In some implementations, one or more microservice nodes can form a hyper-accurate location platform. In other words, one or more microservice nodes can, collectively, operate to store raw satellite data from hundreds or thousands of reference stations, can provide raw satellite data to hundreds, thousands, or even millions of client devices, and/or the like.

Further, FIGS. 1A-1H illustrate a microservice node and cloud computing environment as including a single format converter device, a single data store device, and a single post processor device. However, in some implementations, a given microservice node can include one or more of each of these devices. In other words, in practice, a given microservice node and/or cloud computing environment can include one or more format converter devices, one or more data store devices, one or more post processor devices, and/or the like. In some implementations, load balancers can be appropriately arranged in order to balance traffic between the one or more reference stations, the one or more format converter devices, the one or more data store devices, the one or more post processor devices, and/or the one or more client devices.

Figure 2A:
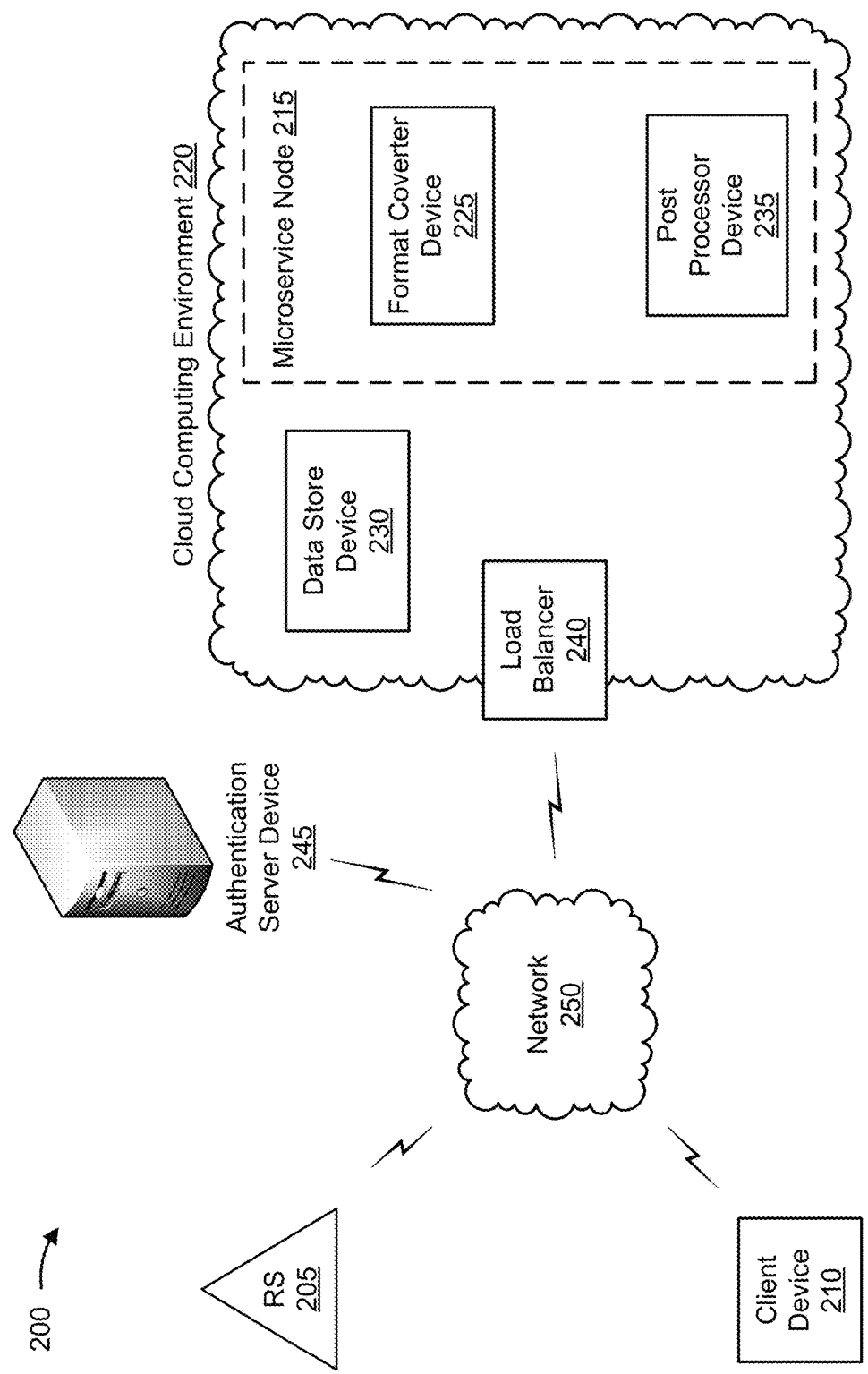
FIGS. 2A and 2B are diagrams associated with an example environment in which systems and/or methods, described herein, can be implemented.
Figure 2B:
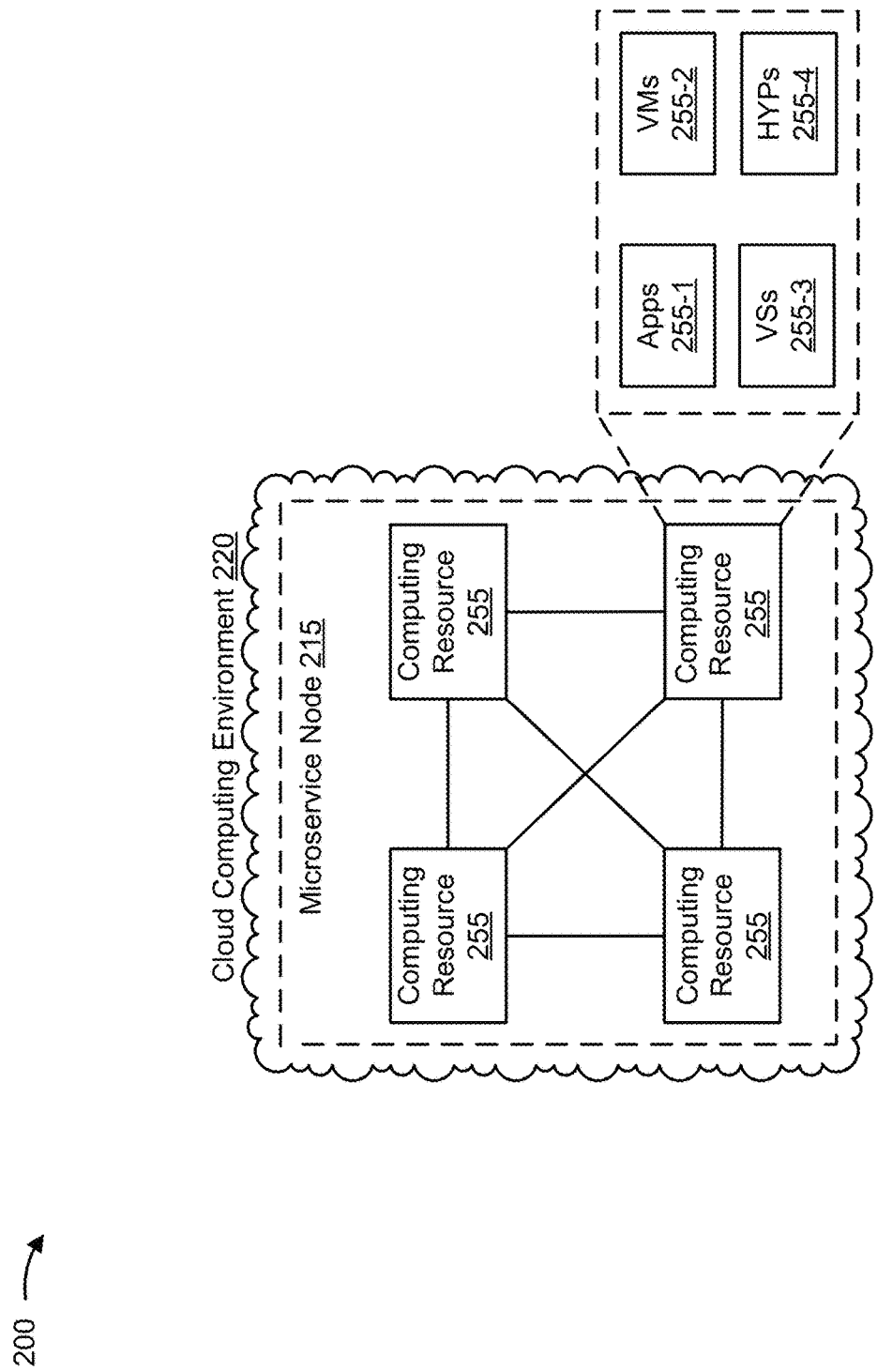

FIGS. 2A and 2B are diagrams associated with an example environment 200 in which systems and/or methods, described herein, can be implemented. As shown in FIG. 2A, environment 200 can include one or more reference stations 205 (herein referred to collectively as reference stations 205 and individually as reference station 205), one or more client devices 210 (herein referred to collectively as client devices 210 and individually as client device 210), a microservice node 215 (e.g., hosted in a cloud computing environment 220 that includes one or more load balancers 240 (herein referred to collectively as load balancers 240 and individually as load balancer 240), and one or more data store devices 230 (herein referred to collectively as data store devices 230 and individually as data store device 230)). Microservice node 215 can further include one or more format converter devices 225 (herein referred to collectively as format converter devices 225 and individually as format converter device 225), and/or one or more post processor devices 235 (herein referred to collectively as post processor devices 235 and individually as post processor device 235). Devices of environment 200 can interconnect via wired connections, wireless connections, or a combination of wired and wireless connections.

Reference station 205 includes one or more devices capable of receiving, generating, storing, processing, and/or providing information associated with storing and providing raw satellite data, as described herein. For example, reference station 205 can include a base station, a reference receiver, and/or the like, that is capable of receiving, generating, storing, processing, and/or providing information, such as raw satellite data associated with one or more satellite constellations, as described herein.

Client device 210 includes one or more devices capable of receiving, generating, storing, processing, and/or providing information associated with raw satellite data stored by microservice node 215, as described herein. For example, client device 210 can include an RTK-enabled communication and/or computing device, such as a mobile phone (e.g., a smart phone, a radiotelephone, and/or the like), a laptop computer, a tablet computer, a handheld computer, a gaming device, a wearable communication device (e.g., a smart wristwatch, a pair of smart eyeglasses, and/or the like), a stand-alone navigation device, a device that is integrated into a vehicle (e.g., a built-in navigation device, an infotainment system device, and/or the like), and/or a similar type of device. In some implementations, client device 210 can transmit, to microservice node 215, requests for raw satellite data, can receive, from microservice node 215, compressed electronic files that include the raw satellite data, can use raw satellite data in an RTK engine to generate corrections data based on the raw satellite data, and/or the like.

Microservice node 215 includes a system (i.e., one or more devices) capable of storing and providing raw satellite data, as described herein. Format converter device 225 includes one or more devices capable of receiving raw satellite data from reference station 205, capable of providing a network RTK engine that can store the raw satellite data in one or more electronic files, combine the one or more electronic files into a compressed electronic file, store the compressed electronic file in a data store provided by data store device 230, and/or the like.

Data store device 230 includes one or more devices capable of storing raw satellite data associated with one or more GNSS satellites. In some implementations, data store device 230 includes a memory device, a storage device, a cloud-based storage platform, and/or the like, that is capable of providing a data store for storing compressed electronic files that include raw satellite data.

Post processor device 235 includes one or more devices capable of receiving requests for raw satellite data from client device 210, capable of identifying one or more compressed electronic files stored in the data store provided by data store device 230, capable of combining the one or more compressed electronic files into another compressed electronic file, capable of transmitting the other compressed electronic file to client device 210 to satisfy the request, and/or the like. In some implementations, post processor device 235 is capable of transmitting, to authentication server device 245, an authentication request based on an authentication token, a username and password, a passcode, and/or another type of authentication means provided by client device 210.

Load balancer 240 includes one or more devices capable of performing load balancing associated with storing and providing raw satellite data by microservice node 215. For example, one or more load balancers 240 can be arranged to perform load balancing associated with balancing multiple raw satellite data streams (e.g., provided by one or more reference stations 205). As another example, one or more load balancers 240 can be arranged to perform load balancing associated with balancing traffic of connections between one or more client devices 210 and post processor device 235.

In some implementations, as shown, one or more devices of microservice node 215 can be hosted in cloud computing environment 220. Notably, while implementations described herein describe microservice node 215 as being hosted in cloud computing environment 220, in some implementations, microservice node 215 is not cloud-based (i.e., can be implemented outside of a cloud computing environment) or can be partially cloud-based. Additional details regarding cloud computing environment 220 are described below with regard to FIG. 2B.

Authentication server device 245 includes one or more devices capable of authenticating client devices 210 for the web portal provided by post processor device 235. For example, authentication server device 245 can receive an authentication request from post processor device 235, can verify the authentication token, username and password, passcode, and/or other type of authentication means provided by client device 210 in order for post processor device 235 to grant client device 210 with access to microservice node 215, the data store provided by data store device 230, and/or the raw satellite data stored in the data store.

Network 250 includes one or more wired and/or wireless networks. For example, network 250 can include a cellular network (e.g., a LTE network, a NR network, a 3G network, a CDMA network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

FIG. 2B is a diagram showing example components of cloud computing environment 220 in which one or more microservice nodes 215 can be configured. Cloud computing environment 220 includes an environment that delivers computing as a service, whereby shared resources, services, and/or the like, can be provided. Cloud computing environment 220 can provide computation, software, data access, storage, and/or other services that do not require end-user knowledge of a physical location and configuration of a system and/or a device that delivers the services. As shown, cloud computing environment 220 can include computing resources 255. In some implementations, one or more microservice nodes 215, one or more devices of a given microservice node 215, and/or one or more other devices included in cloud computing environment 220 (e.g., format converter device 225, data store device 230, post processor device 235, load balancer 240, and/or the like), can be implemented using computing resources 255 of cloud computing environment 220.

Computing resource 255 includes one or more servers, groups of servers, computers, or other types of computation and/or communication devices. In some implementations, one or more computing resources 255 can be configured to operate as one or more components of one or more microservice nodes 215. Cloud resources can include compute instances executing in computing resource 255, storage devices provided in computing resource 255, data transfer devices provided by computing resource 255, and/or the like. In some implementations, computing resource 255 can communicate with other computing resources 255 via wired connections, wireless connections, or a combination of wired and wireless connections.

As further shown in FIG. 2B, computing resource 255 can include a group of cloud resources, such as one or more applications ("APPs") 255-1, one or more virtual machines ("VMs") 255-2, virtualized storage ("VSs") 255-3, one or more hypervisors ("HYPs") 255-4, or the like.

Application 255-1 includes one or more software applications that can be provided to or accessed by reference station 205, client device 210, and/or the like. Application 255-1 can eliminate a need to install and execute the software applications on these devices. For example, application 255-1 can include software associated with microservice node 215 and/or any other software capable of being provided via cloud computing environment 220. In some implementations, one application 255-1 can send/receive information to/from one or more other applications 255-1, via virtual machine 255-2.

Virtual machine 255-2 includes a software implementation of a machine (e.g., a computer) that executes programs like a physical machine. Virtual machine 255-2 can be, for example, a system virtual machine or a process virtual machine, depending upon use and degree of correspondence to any real machine by virtual machine 255-2. A system virtual machine can provide a complete system platform that supports execution of a complete operating system ("OS"). A process virtual machine can execute a single program, and can support a single process. In some implementations, virtual machine 255-2 can execute on behalf of a user (e.g., client device 210), and can manage infrastructure of cloud computing environment 220, such as data management, synchronization, or long-duration data transfers. In some implementations, virtual machine 255-2 can be another type of virtual machine that provides another type of virtualization. For example, virtual machine 255-2 can be an OS-level virtual machine that provides OS-level virtualization. Notably, while computing resource 255 is shown as including virtual machine 255-2, computing resource 255 can include another type of virtual device in some implementations, such as one or more virtual containers (e.g., Docker, Kubernetes, LXC, workload partitions, and/or the like).

Virtualized storage 255-3 includes one or more storage systems and/or one or more devices that use virtualization techniques within the storage systems or devices of computing resource 255. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can provide administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 255-4 provides hardware virtualization techniques that allow multiple operating systems (e.g., "guest operating systems") to execute concurrently on a host computer, such as computing resource 255. Hypervisor 255-4 can present a virtual operating platform to the guest operating systems, and can manage the execution of the guest operating systems. Multiple instances of a variety of operating systems can share virtualized hardware resources.

In some implementations, one or more microservice nodes 215 and/or one or more components of a given microservice node 215 can be implemented in one or more computing resources 255. For example, one or more microservice nodes 215 and/or one or more components of a given microservice node 215 can be implemented (as software) using one or more APPs 255-1, one or more VMs 255-2, and/or the like.

The number and arrangement of devices and networks shown in FIGS. 2A and 2B are provided as examples. In practice, there can be additional devices and/or networks, fewer devices and/or networks, different devices and/or networks, or differently arranged devices and/or networks than those shown in FIGS. 2A and 2B. Furthermore, two or more devices shown in FIGS. 2A and/or 2B can be implemented within a single device, or a single device shown in FIGS. 2A and/or 2B can be implemented as multiple, distributed devices. Additionally, or alternatively, a set of devices (e.g., one or more devices) of environment 200 can perform one or more functions described as being performed by another set of devices of environment 200.

Figure 3:
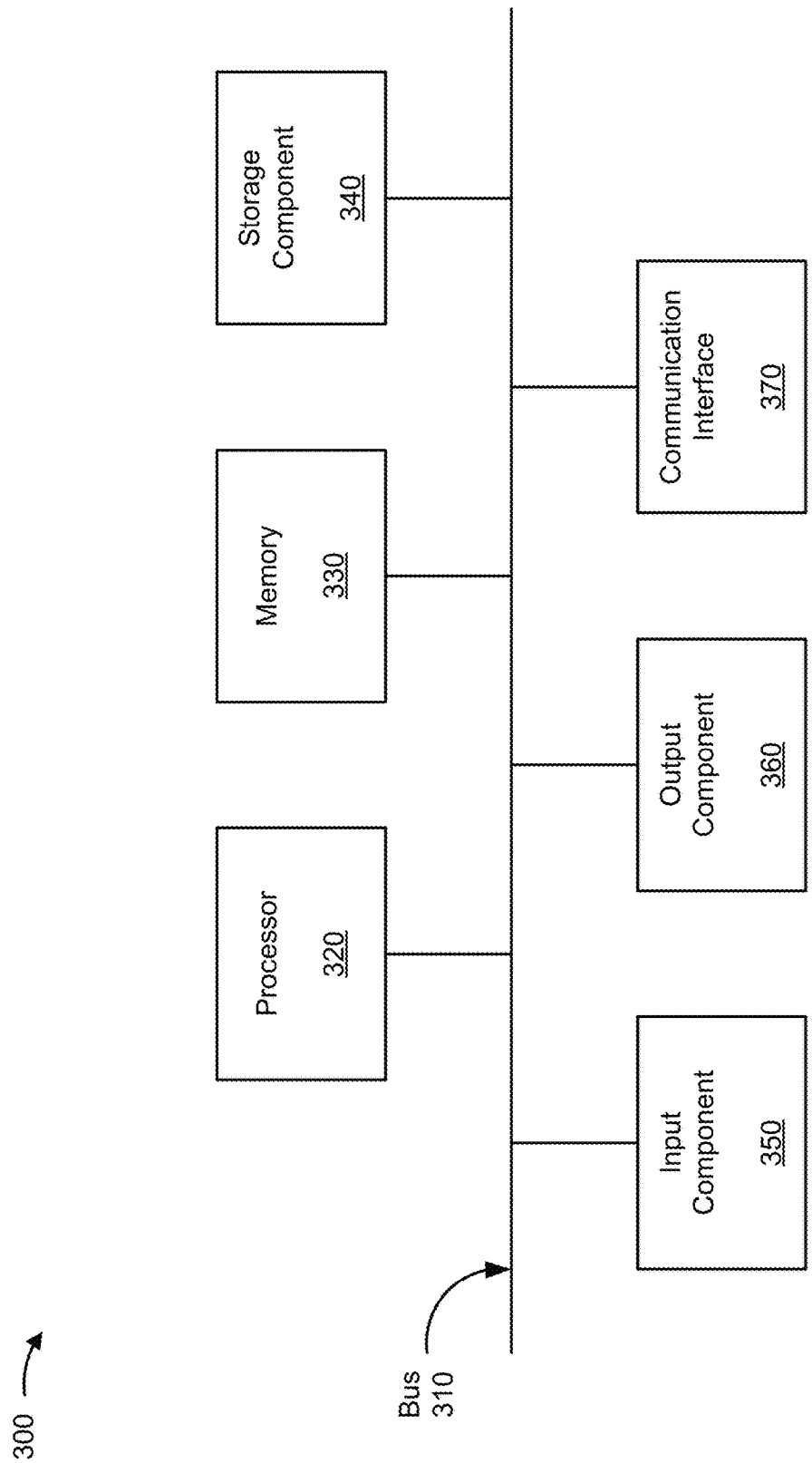
FIG. 3 is a diagram of example components of one or more devices of FIGS. 2A and/or 2B.

FIG. 3 is a diagram of example components of a device 300. Device 300 can correspond to reference station 205, client device 210, microservice node 215, format converter device 225, data store device 230, post processor device 235, load balancer 240, authentication server device 245, one or more devices included in network 250, and/or computing resource 255. In some implementations, reference station 205, client device 210, microservice node 215, format converter device 225, data store device 230, post processor device 235, load balancer 240, authentication server device 245, one or more devices included in network 250, and/or computing resource 255 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
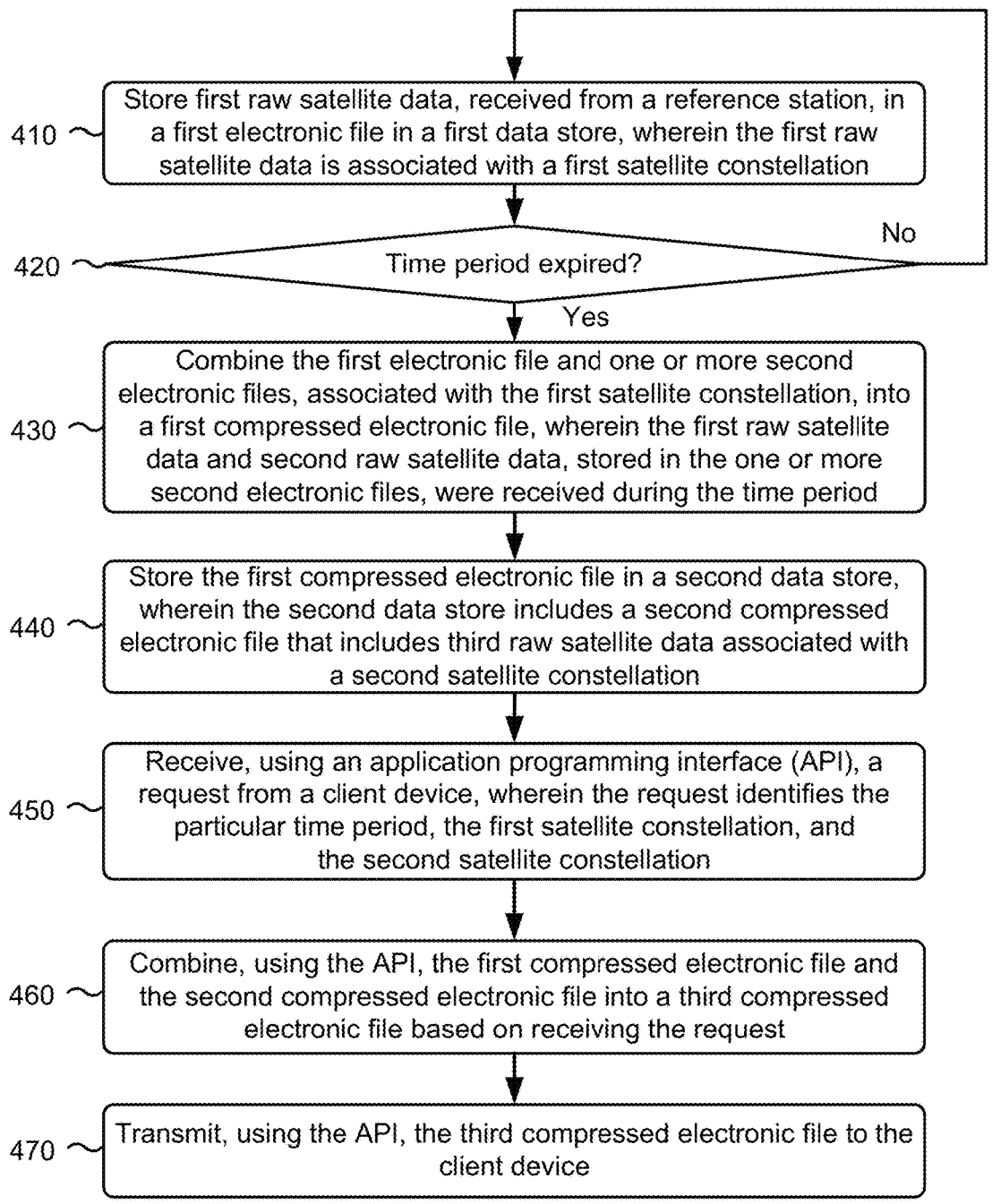
FIG. 4 is a flow chart of an example process for storing and providing raw satellite data.

FIG. 4 is a flow chart of an example process 400 for storing and providing raw satellite data. In some implementations, one or more process blocks of FIG. 4 can be performed by microservice node (e.g., microservice node 215). In some implementations, one or more process blocks of FIG. 4 can be performed by another device or a group of devices separate from or including the microservice node, such as a reference station (e.g., reference station 205), a client device (e.g., client device 210), a load balancer (e.g., load balancer 240), an authentication server (e.g., authentication server device 245), and/or the like.

As shown in FIG. 4, process 400 can include storing first raw satellite data, received from a reference station, in a first electronic file in a first data store, wherein the first raw satellite data is associated with a first satellite constellation (block 410). For example, the microservice node (e.g., using format converter device 225, computing resource 255, processor 320, memory 330, storage component 340, input component 350, output component 360, communication interface 370 and/or the like) can store first raw satellite data, received from a reference station, in a first electronic file in a first data store, as described above. In some implementations, the first raw satellite data is associated with a first satellite constellation.

As shown in FIG. 4, process 400 can include determining whether a time period has expired (block 420). For example, the microservice node (e.g., using format converter device 225, computing resource 255, processor 320, memory 330, storage component 340, input component 350, output component 360, communication interface 370 and/or the like) can determine whether a time period has expired, as described above. In some implementations, the time period may include a current time period in which raw satellite data is being received and stored. If the microservice node determines that the time period has not expired (block 420—No), process 400 can return to block 410, where the microservice node can continue to receive raw satellite data during the time period.

As further shown in FIG. 4, if the microservice node determines that the time period has expired (block 420—Yes), process 400 can include combining the first electronic file and one or more second electronic files, associated with the first satellite constellation, into a first compressed electronic file, wherein the first raw satellite data and second raw satellite data, stored in the one or more second electronic files, were received during the time period (block 430). For example, the microservice node (e.g., using format converter device 225, computing resource 255, processor 320, memory 330, storage component 340, input component 350, output component 360, communication interface 370 and/or the like) can combine the first electronic file and one or more second electronic files, associated with the first satellite constellation, into a first compressed electronic file, as described above. In some implementations, the first raw satellite data and second raw satellite data, stored in the one or more second electronic files, were received during the time period.

As further shown in FIG. 4, process 400 can include storing the first compressed electronic file in a second data store, wherein the second data store includes a second compressed electronic file that includes third raw satellite data associated with a second satellite constellation (block 440). For example, the microservice node (e.g., using format converter device 225, data store device 230, computing resource 255, processor 320, memory 330, storage component 340, input component 350, output component 360, communication interface 370 and/or the like) can store the first compressed electronic file in a second data store, as described above. In some implementations, the second data store includes a second compressed electronic file that includes third raw satellite data associated with a second satellite constellation.

As further shown in FIG. 4, process 400 can include receiving, using an API, a request from a client device, wherein the request identifies the particular time period, the first satellite constellation, and the second satellite constellation (block 450). For example, the microservice node (e.g., using post processor device 235, computing resource 255, processor 320, memory 330, storage component 340, input component 350, output component 360, communication interface 370 and/or the like) can receive, using an API, a request from a client device, as described above. In some implementations, the request identifies the particular time period, the first satellite constellation, and the second satellite constellation As further shown in FIG. 4, process 400 can include combining, using the API, the first compressed electronic file and the second compressed electronic file into a third compressed electronic file based on receiving the request (block 460). For example, the microservice node (e.g., using data store device 230, post processor device 235, computing resource 255, processor 320, memory 330, storage component 340, input component 350, output component 360, communication interface 370 and/or the like) can combine, using the API, the first compressed electronic file and the second compressed electronic file into a third compressed electronic file based on receiving the request, as described above.

As further shown in FIG. 4, process 400 can include transmitting, using the API, the third compressed electronic file to the client device (block 470). For example, the microservice node (e.g., using post processor device 235, computing resource 255, processor 320, memory 330, storage component 340, input component 350, output component 360, communication interface 370 and/or the like) can transmit, using the API, the third compressed electronic file to the client device, as described above.

Process 400 can include additional implementations, such as any single implementation or any combination of implementations described below and/or in connection with one or more other processes described elsewhere herein.

In some implementations, combining the first compressed electronic file and the second compressed electronic file into the third compressed electronic file comprises combining the first compressed electronic file and the second compressed electronic file into a third compressed electronic file based on validating an authentication token, associated with the client device, with an authentication server. In some implementations, process 400 further comprises receiving the second raw satellite data from one or more other reference stations and storing the second raw satellite data in the one or more second electronic files. In some implementations, the request identifies the reference station and the one or more other reference stations.

In some implementations, receiving the request from the client device comprises receiving the request via a web portal associated with the microservice node. In some implementations, receiving the request from the client device comprises: receiving the request via a REST API. In some implementations, the first electronic file, in the first data store, is associated with information identifying a receiver identifier associated with the reference station, a date and time the first raw satellite data was received at the reference station, and the first satellite constellation.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

The foregoing disclosure provides illustration and description, but is not intended to be exhaustive or to limit the implementations to the precise form disclosed. Modifications and variations can be made in light of the above disclosure or can be acquired from practice of the implementations.

As used herein, the term "component" is intended to be broadly construed as hardware, firmware, or a combination of hardware and software.

As used herein, satisfying a threshold can, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein can be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features can be combined in ways not specifically recited in the claims and/or disclosed in the specification. Although each dependent claim listed below can directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    storing, by a microservice node, first raw satellite data, received from a reference station, in a first electronic file in a first data store,
        wherein the first raw satellite data is associated with a first satellite constellation;
    combining, by the microservice node, the first electronic file and one or more second electronic files, associated with the first satellite constellation, into a first compressed electronic file,
        wherein the first raw satellite data and second raw satellite data, stored in the one or more second electronic files, were received during a particular time period;
    storing, by the microservice node, the first compressed electronic file in a second data store,
        wherein the second data store includes a second compressed electronic file that includes third raw satellite data associated with a second satellite constellation;
    receiving, by the microservice node and using an application programming interface (API), a request from a client device,
        wherein the request identifies:
            the particular time period,
            the first satellite constellation, and
            the second satellite constellation;
    combining, by the microservice node and using the API, the first compressed electronic file and the second compressed electronic file into a third compressed electronic file based on receiving the request; and
    transmitting, by the microservice node and using the API, the third compressed electronic file to the client device.

2. The method of claim 1, wherein combining the first compressed electronic file and the second compressed electronic file into the third compressed electronic file comprises:
 combining the first compressed electronic file and the second compressed electronic file into the third compressed electronic file based on validating an authentication token, associated with the client device, with an authentication server.

3. The method of claim 1, further comprising:
 receiving the second raw satellite data from one or more other reference stations; and
 storing the second raw satellite data in the one or more second electronic files.

4. The method of claim 3, wherein the request identifies:
 the reference station, and
 the one or more other reference stations.

5. The method of claim 1, wherein receiving the request from the client device comprises:
 receiving the request via a web portal associated with the microservice node.

6. The method of claim 1, wherein receiving the request from the client device comprises:
 receiving the request via a representational state transfer (REST) API.

7. The method of claim 1, wherein the first electronic file, in the first data store, is associated with information identifying:
 a receiver identifier associated with the reference station,
 a date and time the first raw satellite data was received at the reference station, and
 the first satellite constellation.

8. A microservice node, comprising:
 one or more memories; and
 one or more processors communicatively coupled to the one or more memories, to:
  store first raw satellite data, received from a reference station, in a first electronic file in a first data store, wherein the first raw satellite data is associated with a first satellite constellation;
  combine the first electronic file and one or more second electronic files, associated with the first satellite constellation, into a first compressed electronic file, wherein the first raw satellite data and second raw satellite data, stored in the one or more second electronic files, were received during a particular time period;
  store the first compressed electronic file in a second data store,
   wherein the second data store includes a second compressed electronic file that includes third raw satellite data associated with a second satellite constellation;
  receive, using an application programming interface (API), a request from a client device,
   wherein the request identifies:
    the particular time period,
    the first satellite constellation, and
    the second satellite constellation;
  combine, using the API, the first compressed electronic file and the second compressed electronic file into a third compressed electronic file based on receiving the request; and
  transmit, using the API, the third compressed electronic file to the client device.

9. The microservice node of claim 8, wherein the one or more processors, when combining the first compressed electronic file and the second compressed electronic file into the third compressed electronic file, are to:
 combine the first compressed electronic file and the second compressed electronic file into the third compressed electronic file based on validating an authentication token, associated with the client device, with an authentication server.

10. The microservice node of claim 8, wherein the one or more processors are further to:
 receive the second raw satellite data from one or more other reference stations; and
 store the second raw satellite data in the one or more second electronic files.

11. The microservice node of claim 10, wherein the request identifies:
 the reference station, and
 the one or more other reference stations.

12. The microservice node of claim 8, wherein the one or more processors, when receiving the request from the client device, are to:
 receive the request via a web portal associated with the microservice node.

13. The microservice node of claim 8, wherein the one or more processors, when receiving the request from the client device, are to:
 receive the request via a representational state transfer (REST) API.

14. The microservice node of claim 8, wherein the first electronic file, in the first data store, is associated with information identifying:
 a receiver identifier associated with the reference station,
 a date and time the first raw satellite data was received at the reference station, and
 the first satellite constellation.

15. A non-transitory computer-readable medium storing instructions, the instructions comprising:
 one or more instructions that, when executed by one or more processors of a microservice node, cause the one or more processors to:
  store first raw satellite data, received from a reference station, in a first electronic file in a first data store, wherein the first raw satellite data is associated with a first satellite constellation;
  combine the first electronic file and one or more second electronic files, associated with the first satellite constellation, into a first compressed electronic file, wherein the first raw satellite data and second raw satellite data, stored in the one or more second electronic files, were received during a particular time period;
  store the first compressed electronic file in a second data store,
   wherein the second data store includes a second compressed electronic file that includes third raw satellite data associated with a second satellite constellation;
  receive, using an application programming interface (API), a request from a client device,
   wherein the request identifies:
    the particular time period,
    the first satellite constellation, and
    the second satellite constellation;
  combine, using the API, the first compressed electronic file and the second compressed electronic file into a third compressed electronic file based on receiving the request; and transmit, using the API, the third compressed electronic file to the client device.

16. The non-transitory computer-readable medium of claim 15, wherein the one or more instructions, that cause the one or more processors to combine the first compressed electronic file and the second compressed electronic file into the third compressed electronic file, cause the one or more processors to:
 combine the first compressed electronic file and the second compressed electronic file into the third compressed electronic file based on validating an authentication token, associated with the client device, with an authentication server.

17. The non-transitory computer-readable medium of claim 15, wherein the one or more instructions, when executed by the one or more processors, further cause the one or more processors to:
 receive the second raw satellite data from one or more other reference stations; and
 store the second raw satellite data in the one or more second electronic files.

18. The non-transitory computer-readable medium of claim 17, wherein the request identifies:
 the reference station, and
 the one or more other reference stations.

19. The non-transitory computer-readable medium of claim 15, wherein the one or more instructions, that cause the one or more processors to receive the request from the client device, cause the one or more processors to:
 receive the request via a web portal associated with the microservice node.

20. The non-transitory computer-readable medium of claim 15, wherein the one or more instructions, that cause the one or more processors to receive the request from the client device, cause the one or more processors to:
 receive the request via a representational state transfer (REST) API.

* * * * *